United States Patent Office 2,850,098
Patented Sept. 2, 1958

2,850,098

METHOD FOR THE REMOVAL OF PETRIFACTIONS, INCRUSTATIONS AND OTHER CONTAMINATING SUBSTANCES IN WELLS, PIPES, MACHINE PARTS AND LIKE EQUIPMENT BY TREATMENT WITH A GASEOUS ACID

Bernhard Moll and Heinz Sustmann, Wesseling Bezerh, Koln, and Arthur Schneider, Koln-Ehrenfeld, Germany, assignors to Union Rheinische Braunkohlen Kraftstoff Aktiengesellschaft, Koln, Germany, a corporation of Germany No Drawing. Application June 30, 1955
Serial No. 519,267

2 Claims. (Cl. 166—42)

The present invention relates to an improved and simple method for the removal of petrifactions, incrustations and other contaminating substances in wells, pipes, machine parts and the like by treatment with a gaseous acid.

It is known to increase the production rate of water wells which have been rendered inoperative due to contamination, petrifaction, incrustation or by the deposit of manganese oxide, iron oxide and the like, by injecting into the wells a mixture of air and water in countercurrent to the normal direction of flow, and then rapidly effecting pressure release; the alternate application of pressure and pressure release at short intervals can be repeated several times. This method is especially effective when applied in combination with chemicals, such as acids, oxidizing agents and solvents. The contaminating substances preventing or inhibiting the delivery of water to the surface can also be removed in an efficient manner by subjecting these substances to the interaction of two acids or two substances yielding acids, which react with each other preferably with the evolution of heat, said acids or substances yielding acids being introduced into the well in a gaseous condition.

This method allows of obtaining a better efficiency than is possible when the acids are applied in liquid form.

An object of the present invention is to provide a highly effective, economic and simple method of increasing the production rate of wells by removing petrifactions, incrustations and other contaminating substances in bore holes or in the filter gravel about bore holes.

Another object of the invention is to provide an efficient and convenient method of purifying and cleaning pipes, machine parts, metal sheets, plates and other equipment by removing petrifactions, incrustations and other contaminating substances deposited thereon.

Further specific objects will become apparent to those skilled in the art as the following description proceeds.

In accordance with the present invention it has been found that the production rate of wells, for instance water wells, can be considerably increased in a simple manner by removing petrifactions, incrustations and other contaminating substances from wells or the filter gravel surrounding wells which comprises injecting into a hermetically sealed well a gaseous acid which chemically reacts with the contaminating substances in the well or in the filter gravel about the bore hole. By carrying out analytical investigations it is possible to determine the nature of the contaminating substances deleteriously affecting the production rate of a well and, accordingly, to choose a suitable treating acid. If, for instance the bore hole or the filter pack about the well is contaminated with carbonates and oxide hydrates, hydrogen chloride will be injected into the well to react with and to dissolve said substances. The dissolved contaminating substances are washed off by the flow of water after releasing pressure.

As compared with the application of liquid acids, acids which are introduced into a well in their gaseous state have the advantage that a higher concentration of acid can be reached at the place where the treating acid is to react with the contaminating substances. The acid concentration can still further be increased by keeping the place where the reaction is to take place as free from water as possible. Therefore, according to a preferred embodiment of the invention the water level in the well is lowered or the water is forced to flow off from the well, prior to the treatment with the acid, by injecting compressed air or another pressure medium into the well and then introducing through a pipe extending to the bottom of the well for instance gaseous hydrochloric acid under a pressure slightly higher than the pressure previously applied for injecting the compressed air, in order to prevent the water from prematurely flowing back to the place where the reaction between the treating acid and the contaminating substances is to take place. In practicing the invention in the aforedescribed manner, a violent reaction accompanied by the evolution of heat takes place where the contaminating substances are contacted with the treating acid, normally at the end of the filter tube and in the filter gravel, and, because of the low quantity of water left there, any desired high concentration of the treating acid can be obtained by the use of relatively low quantities of acid gas. As soon as the pressure is released, water flows back into the well while simultaneously carrying along the dissolved contaminating substances. Depending upon the amount and extent of the contaminating substances and accumulation in the well and the filter pack about the well, the method of the invention is repeated several times.

The dissolution and removal of contaminating substances, which affect the delivery of water by means of a well, can be promoted by locating in the vicinity of the well additional tubes, which terminate in the water bearing strata at a certain distance from the well, and injecting a suitable gaseous acid through these additional tubes into the filter gravel about the well. These additional tubes can be used alternately for cleaning purposes and for raising water.

Though the invention has been described with particular reference to the removal of contaminating substances from wells or filter gravel about wells, it is by no means intended to be restricted to this specific usage but can also be used for many other fields of application of which some are indicated below.

If it is desired to clean a filter of for instance sand or gravel, water can be run off while the filter is open at the top or the water is sucked off and gaseous acid is passed through the filter to be cleaned from below. When the filter is closed, the gaseous acid can be caused to stream through the filter from above after the water has run off. This embodiment is advantageous since the major proportion of the contaminating substances is usually deposited on the upper side of the filter. The gaseous acid can also be entrained by a stream of compressed air.

Externally petrified parts can be wetted and then subjected to the action of a gaseous acid, if desired in a closed gas chamber which is provided with a discharge pipe and in which said parts are treated with the gaseous acid. A dry deposit or incrustation can be removed by steaming and/or previous washing with water. It may be advantageous to combine the gas treatment with the application of steam in order to keep proper moisture conditions.

The method of the invention can further be applied to the pickling of metal sheets in a continuous process. The sheets, for instance iron sheets, which are suspended by an endless chain are passed first through a chamber in which they are wetted for instance by steam, which simultaneously shuts off the gas chamber from the outside. The metal sheets or plates are then treated with the gaseous acid, subsequently washed and leave the gas chamber through a sluice. The thin acid running off the sheets, which contain the dissolved iron salts, can be collected and used for wetting or pre-acidifying e. g. metal sheets.

It is possible to apply the method of the invention in combination with protective colloids.

We claim:

1. A process for removing contaminates from water wells and the area surrounding such wells which comprises injecting a gas under pressure into a hermetically-sealed well to force a substantial portion of the water out of a treating area, which includes the well and the area immediately adjacent the well, into the more remote areas, then injecting an anhydrous gaseous acid which chemically reacts with the contaminates in the treating area into the well under a pressure which is greater than the pressure of said gas, said anhydrous acid combining with those water particles which tend to adhere to the contaminates in the treating area to form highly concentrated aqueous acids which act to dissolve said contaminates, and then releasing the pressure in the well to effect a return flow of the water from the more remote areas, said water acting to entrain the dissolved contaminates therein.

2. The process of claim 1 wherein said anhydrous gaseous acid is hydrogen chloride.

References Cited in the file of this patent

UNITED STATES PATENTS

| 1,999,146 | Ambrose et al. | Apr. 23, 1935 |
| 2,675,083 | Bond | Apr. 13, 1954 |